United States Patent Office

2,955,946
Patented Oct. 11, 1960

2,955,946

DIELECTRIC CONTAINING BARIUM METATITANATE

Werner Soyck, 11 Holzgartenstrasse, and Josef Herglotz, 14 Am Steg, both of Lauf, Pegnitz, Germany No Drawing. Filed Feb. 21, 1957, Ser. No. 641,471

19 Claims. (Cl. 106—39)

This invention relates to a dielectric containing barium metatitanate.

The use of such dielectrics is advantageous for example for condensers and also for media for piezoelectric uses. They are usually prepared by burning mixtures of barium carbonate and titanium dioxide, often with the addition of other oxides or compounds thereof by which desired properties are imparted to the calcined products. This is achieved by substantially ceramic working methods, but usually synthetic plasticizing agents on an organic basis are used instead of the usual ceramic clay plasticizing agents such as bentonite and kaolin. An addition of clay and kaolin had hitherto to be avoided because the silicic acid in this substance reacted in an unpredictable manner with the barium oxide so that the compounds containing barium metatitanate could not be obtained in the desired composition or the desired physical properties of the dielectrics could not be obtained. The necessity for using synthetic plasticizing agents, however, impairs the possibilities of moulding the crude mass in a desirable way. Consequently products containing barium titanate could only be prepared on a technical scale in simple moulds. The preparation of the constructional designs necessary in high voltage technique in the field of covering rims with increased thickness (edge enlargements) is rendered considerably more difficult by the use of synthetic plasticizing processes.

The present invention provides the possibility of avoiding the said difficulties and drawbacks and does this by a method of working according to which the products containing barium metatitanate can be prepared while using clay and kaolin as binding agents according to normal ceramic working methods. A proportion of clay of at least 5% of the dry batch of the raw materials is necessary.

According to this invention the total proportion of barium oxide in the bath is such that the whole of the titanic acid of the batch is neutralized to barium metatitanate and the whole of the silicic acid of the clay is neutralized to barium metasilicate, but the amount of barium oxide is not substantially in excess of that necessary to accomplish this neutralization. If the proportion of clay in the batch does not exceed 10% of the dry raw materials, the essential properties of the barium metatitanate are retained, although to a reduced extent.

In the disclosure of the U.S. Department of Commerce, National Bureau of Standards, Research Paper RP 1776, volume 38, March 1947, "Properties of Barium-Strontium-Titanate Dielectrics," there is described on page 341 in the specimen with the mark BT a material with the following composition: 65.7% BaO and 34.3% $TiO_2$, maturing temperature 1385° C. for two hours, DK=1500, power factor=1/400 using 1000 kc./s. The applicant adds to the known material an amount of clay to provide 5% clay by weight of the dry batch and a corresponding amount of $BaCO_3$ being able to bind the amount of silicic acid of the clay, i.e. to 5 parts clay (according to the theoretical composition 46.5% silicic acid and 39.5% $Al_2O_3$, remainder $H_2O$) 7.63 parts $BaCO_3$. This will result in a batch having the composition shown in the Example 2. The calculation of the composition is as follows: 65.7% BaO and 34.3% $TiO_2$ corresponds to 71% $BaCO_3$ and 29% $TiO_2$ in the known material. To 87.4 parts of this mixture of $BaCO_3$ and $TiO_2$ are added 5 parts of clay and 7.6 parts of $BaCO_3$, the latter being in an amount stoichiometrically equivalent to the silica in the clay. The percentage by weight of the $BaCO_3$, clay, and $TiO_2$ are then calculated in a known manner to give the composition shown in Example 2. In using a greater amount, i.e. 10% clay double the amount $BaCO_3$ has to be added. This results in the batch having the composition shown in the Example 3, in which there is chosen kaolin instead of clay, the calculations being the same as those set forth above, except that the amount of plasticizer is increased to 10% by weight of dry batch.

The following Examples 2 and 3 show batches according to the invention. Example 1 is a normal metatitanate without clay taken from the above-mentioned publication.

| Example 1 | Example 2 | Example 3 |
|---|---|---|
| 71% of $BaCO_3$ | 70.2% of $BaCO_3$ | 69% of $BaCO_3$ |
| 29% of $TiO_2$ | 24.8% of $TiO_2$ | 21% of $TiO_2$ |
|  | 5% of kaolin | 10% of kaolin |
| DK 1,500 | DK 1,100 | DK 900 |
| $tan^δ$ 100×10$^{-4}$ | $tan^δ$ 30×10$^{-4}$ | $tan^δ$ 60×10$^{-4}$ |

The dielectric constants and the power factors are in respect of room temperature and 1M megacycle. The batches in these examples were sintered at 1385° C. maintaining this temperature for two hours. The constitution analyses of the foregoing products is as follows:

| Example | 1 | 2 | 3 |
|---|---|---|---|
| $BaTiO_3$ ----percent-- | 100 | 87.7 | 75.4 |
| $BaSiO_3$ ----do---- |  | 9.9 | 19.8 |
| $Al_2O_3$ ----do---- |  | 2.4 | 4.8 |

Extensive experiments have shown that it is only the above-mentioned content of barium oxide that produces ceramically useful masses and yields products having approximately the properties of barium metatitanate. An excess of barium oxide leads to porous substances, while too small a proportion of barium oxide leads to substances with an extremely small temperature range for the sintering which are ceramically useless.

The method according to this invention may also be used, in the same way as for barium metatitanate, for masses which form barium metatitanate in conjunction with other oxides or oxide compounds.

As oxide compounds there may be mentioned the metatitanates of strontium, calcium and magnesium, and also the orthotitanate of magnesium, as well as compounds of barium oxide, such as barium zirconate, barium stannate and the like.

It has been found that the following ranges of composition result in an excellent vitrified ceramic dielectric:

75.4–92.5% of barium metatitanate
19.8–6.1% of barium metasilicate
4.8–1.4% of aluminum oxide When the titanates are present in the crude mass or will be formed therefrom, it is obvious that when calculating the proportion of barium, the titanic acid necessary for these titanates will be excluded, as well as the barium oxide proportion for other barium oxide compounds. The following example of a batch illustrates this wider aspect of the invention:

63.2% of barium carbonate
22.7% of titanium dioxide
9.1% of barium stannate and
5.0% of clay The foregoing batch was sintered in a conventional manner at about 1340° C. to 1375° C.

In this case also, with proportions of clay between 5 and 10% by weight of the crude dry batch, products are obtained which as regards their physical properties approximate to those fired without clay.

The barium oxide can be introduced into the mass as barium carbonate or in the form of other barium compounds.

In the U.S. Patent No. 2,402,515 there is disclosed in Table III the favorable effect of the presence of 20% or less of barium-, strontium- or calcium-stannate on the characteristics of barium titanates in the form of mixed dielectrics. Table III contains as Example 3 a material consisting of 100 parts of barium titanate with 10 parts of barium stannate, maturing temperature 1340° C. to 1375° C., having a dielectric constant of 3580 and a power factor of $270.10^{-4}$ using 1000 kc./s. According to our invention this material composition can be treated with clay in the following manner:

| Without Clay | With Clay | Percentage by Weight |
| --- | --- | --- |
| 55.6 parts BaCO$_3$<br>22.7 parts TiO$_2$<br>9.1 parts BaSnO$_3$<br>maturing temperature: 1,340° C. to 1,375° C. | 55.6 BaCO$_3$<br>22.7 TiO$_2$<br>9.1 BaSnO$_3$<br>+5 parts of weight clay<br>+ 7.6 parts of weight BaCO$_3$.<br>maturing temperature: 1,340° C. to 1,375° C. | 63.2 BaCO$_3$.<br>22.7 TiO$_2$.<br>9.1 BaSnO$_3$.<br>5.0 clay. |

The dielectric constants and the power factors are in both cases approximately the same, i.e. the clay content does not substantially lower said qualities. The material according to the invention has a dielectric constant of about 2500 and a power factor of about $50 \times 10^{-4}$ measured at room temperature and 1 megacycle. The constitution analysis of the fired product of our invention is:

77.4% or 100 parts BaTiO$_3$
10.7% or 13 parts BaSnO$_3$
9.6% or 8.25 parts BaSiO$_3$
3.0% or 1.98 parts Al$_2$O$_3$ Further the U.S. Patent 2,443,211 discloses dielectrics from barium titanate with 27 to 35% of strontium titanate and the U.S. Patent 2,402,516 discloses in Table I dielectrics from barium titanate with 15 parts or less of calcium zirconate, strontium zirconate or magnesium zirconate. Further the U.S. Patent 2,452,532 shows in Table I dielectrics from barium titanate and 25 parts or less of an earth alkaline stannate and 10 parts or less of an earth alkaline zirconate. Further reference is made to the disclosure of the U.S. Department of Commerce, National Bureau of Standards, Research Paper 2025, vol. 43, September 1949, "Properties of Calcium Barium Titanate Dielectrics," and Research Paper 1899, vol. 41, July 1948, "Properties of Barium-Magnesium Titanate Dielectrics." All the dielectrics referred to in these disclosures having a content of barium metatitanate can be treated and improved with favorable effect by adding, according to the present invention, clay and BaCO$_3$ for forming barium metasilicate.

In all of the foregoing formulations the percentages are by weight.

This application is a continuation-in-part of our application Serial No. 352,011, filed April 29, 1953, now abandoned.

We claim:

1. A method of producing a dielectric containing barium metatitanate which comprises firing a batch consisting essentially of:
   (a) titanium dioxide
   (b) a clay plasticizing agent selected from the group consisting of kaolin and bentonite
   (c) a barium compound selected from the group consisting of barium oxide and barium carbonate, the barium compound being present in the amount necessary to react with the whole of the calculated titanic acid in the batch to form barium metatitanate and the whole of the calculated silicic acid in the plasticizing agent to form barium metasilicate, but not substantially in excess of that amount necessary to accomplish these reactions, said plasticizing agent being used in an amount between 5% and 10% by weight of the dry batch.

2. A method as claimed in claim 1 wherein the barium compound is barium oxide.

3. A method as claimed in claim 1 wherein the barium compound is barium carbonate.

4. A method as claimed in claim 1 wherein the batch also includes an alkaline earth stannate.

5. A method as claimed in claim 1 wherein the batch also includes an alkaline earth zirconate.

6. A method as claimed in claim 1 wherein the batch also includes an alkaline earth titanate other than barium.

7. A dielectric comprising a fired batch consisting essentially of titanium dioxide, 5% to 10% of a clay plasticizing agent selected from the group consisting of kaolin and bentonite, and an amount of a barium compound sufficient to react with the whole of the calculated titanic acid in the batch to form barium metatitanate and the whole of the calculated silicic acid in the plasticizing agent to form barium metasilicate, but not substantially in excess of that amount necessary to accomplish these reactions, said barium compound being selected from the group consisting of barium oxide and barium carbonate.

8. A dielectric comprising a fired batch composed of 70.2% of barium carbonate, 24.8% of titanium dioxide and 5% of clay plasticizing agent selected from the group consisting of kaolin and bentonite.

9. A dielectric comprising a fired batch composed of 69% of barium carbonate, 21% of titanium dioxide and 10% of kaolin.

10. A dielectric comprising a fired batch composed of 63.2% of barium carbonate, 22.7% of titanium dioxide, 9.1% of barium stannate and 5% of clay plasticizing agent selected from the group consisting of kaolin and bentonite.

11. A vitrified ceramic dielectric consisting of 75.4–92.5% by weight of barium metatitanate, 19.8–6.1% by weight of barium metasilicate, and 4.8–1.4% by weight of aluminium oxide, the calculated silicic acid and the aluminum oxide being proportionately inserted into the raw mass as a clay selected from the group consisting of kaolin and bentonite.

12. A vitrified ceramic dielectric consisting of 75.4–92.5% by weight of barium metatitanate, an alkaline earth titanate other than barium, 19.8–6.1% by weight of barium metasilicate, and 4.8–1.4% by weight of Al$_2$O$_3$, the calculated silicic acid and the aluminum oxide being proportionately inserted into the raw mass as a clay selected from the group consisting of kaolin and bentonite.

13. A vitrified ceramic dielectric consisting of 75.4–92.5% by weight of barium metatitanate, an alkaline earth stannate, 19.8–6.1% by weight of barium metasilicate, and 4.8–1.4% by weight of Al$_2$O$_3$, the calculated silicic acid and the aluminum oxide being proportionately inserted into the raw mass as a clay selected from the group consisting of kaolin and bentonite.

14. A vitrified ceramic dielectric consisting of 75.4–92.5% by weight of barium metatitanate, an alkaline earth zirconate, 19.8–6.1% by weight of barium metasilicate, and 4.8–1.4% by weight of aluminum oxide, the calculated silicic acid and the aluminum oxide being proportionately inserted into the raw mass as a clay selected from the group consisting of kaolin and bentonite.

15. A vitrified ceramic dielectric consisting of 75.4–92.5% by weight of barium metatitanate, an alkaline earth stannate and an alkaline earth zirconate, 19.8–6.1% by weight of barium metasilicate, and 4.8–1.4% by weight of aluminum oxide, the calculated silicic acid and the aluminum oxide being proportionately inserted into the raw mass as a clay selected from the group consisting of kaolin and bentonite.

16. A method as claimed in claim 1 in which the plasticizing agent is kaolin.

17. A method as claimed in claim 1 in which the plasticizing agent is bentonite.

18. A dielectric as claimed in claim 7 in which the plasticizing agent is kaolin.

19. A dielectric as claimed in claim 7 in which the plasticizing agent is bentonite.

References Cited in the file of this patent

UNITED STATES PATENTS

| | | |
|---|---|---|
| 2,098,812 | Pulfrich | Nov. 9, 1937 |
| 2,165,819 | Albers-Schonberg | July 11, 1939 |
| 2,402,515 | Wainer | June 18, 1946 |
| 2,402,516 | Wainer | June 18, 1946 |
| 2,424,111 | Navias et al. | July 15, 1947 |
| 2,443,211 | Wainer et al. | June 15, 1948 |
| 2,452,532 | Wainer | Oct. 26, 1948 |
| 2,467,169 | Wainer | Apr. 12, 1949 |
| 2,486,560 | Gray | Nov. 1, 1949 |
| 2,691,597 | Mollers | Oct. 12, 1954 |
| 2,815,291 | Rogatz | Dec. 3, 1957 |

FOREIGN PATENTS

| | | |
|---|---|---|
| 579,868 | Great Britain | Aug. 19, 1946 |
| 142,833 | Australia | 1951 |

OTHER REFERENCES

Ries: "Economic Geology," pub. 1925, by John Wiley & Sons, N.Y., chapter IV (pages 174–175).

Searle: Refractory Materials, pub. 1950, London, by Chas. Griffin & Co. (page 27).